United States Patent
Fireberger et al.

(10) Patent No.: US 12,518,054 B2
(45) Date of Patent: Jan. 6, 2026

(54) SYSTEM AND METHOD FOR FEDERATED LEARNING

(71) Applicant: Microsoft Technology Licensing, LLC, Redmond, WA (US)

(72) Inventors: Aviram Fireberger, Kibbutz Karmia (IL); Hadas Bitran, Ramat Hasharon (IL); Shahar Admati, Tel Aviv (IL); Tal Baumel, Tel Aviv (IL); Danny Karmon, Petah Tikva (IL)

(73) Assignee: Microsoft Technology Licensing, LLC., Redmond, WA (US)

( * ) Notice: Subject to any disclaimer, the term of this patent is extended or adjusted under 35 U.S.C. 154(b) by 153 days.

(21) Appl. No.: 18/145,395

(22) Filed: Dec. 22, 2022

(65) Prior Publication Data

US 2024/0211633 A1 Jun. 27, 2024

(51) Int. Cl.
*G06F 21/62* (2013.01)

(52) U.S. Cl.
CPC ................ *G06F 21/6254* (2013.01)

(58) Field of Classification Search
CPC ............ G06F 21/6254; G06F 21/6245; G06F 40/279; G06N 20/00; G06N 3/098
USPC .......................................................... 726/26
See application file for complete search history.

(56) References Cited

U.S. PATENT DOCUMENTS

| | | | | |
|---|---|---|---|---|
| 2014/0222349 A1* | 8/2014 | Higgins | .................. | G16B 20/00 702/19 |
| 2018/0018590 A1* | 1/2018 | Szeto | ...................... | G16H 50/20 |
| 2020/0175987 A1 | 6/2020 | Thomson et al. | | |
| 2021/0248268 A1 | 8/2021 | Ardhanari et al. | | |
| 2021/0256309 A1 | 8/2021 | Huth et al. | | |
| 2021/0409197 A1 | 12/2021 | Baracaldo Angel et al. | | |
| 2022/0043920 A1 | 2/2022 | Zhang et al. | | |
| 2022/0382891 A1* | 12/2022 | Shmidov | ............... | G06F 16/245 |
| 2024/0070295 A1* | 2/2024 | Kwok | .................... | G06F 21/602 |
| 2024/0106627 A1* | 3/2024 | Prasad | ................. | G06N 3/0464 |
| 2024/0119176 A1* | 4/2024 | Ardhanari | ............... | G06F 21/53 |
| 2024/0193487 A1* | 6/2024 | Farnan | ..................... | G06N 3/08 |

OTHER PUBLICATIONS

"Federated Learning", Retrieved from: https://docs.nvidia.com/clara/tlt-mi_archive/clara-train-sdk-v2.0/nvmidl/additional_features/federated_learning.html, Retrieved Date: Oct. 18, 2022, 16 Pages.
International Search Report and Written Opinion received for PCT Application No. PCT/US2023/081710, mailed on Feb. 1, 2024, 11 pages.
International Preliminary Report on Patentability (Chapter I) received for PCT Application No. PCT/US2023/081710, mailed on Jul. 3, 2025, 6 pages.

* cited by examiner

*Primary Examiner* — Chirag R Patel
(74) *Attorney, Agent, or Firm* — Foley IP Law, PLLC

(57) ABSTRACT

A method, computer program product, and computing system for processing a raw content portion to identify personal information, thus defining identified personal information; confirming the efficacy of the identified personal information; replacing the identified personal information within the raw content portion with one or more surrogates, thus defining a deidentified content portion; and performing a federated learning operation on the deidentified content portion to generate training data for a machine learning model.

18 Claims, 6 Drawing Sheets

SYSTEM AND METHOD FOR FEDERATED LEARNING

TECHNICAL FIELD

This disclosure relates to systems and methods for federated learning and, more particularly, to systems and methods for federated learning using sensitive data.

BACKGROUND

As is known in the art, medical professionals may use various computer systems to perform their job. For example, various professionals may use computer systems to review pieces of medical information, interact with patients, etc.

Further, such ML models need to be trained in order to enhance the accuracy of the same, wherein the training of such models occurs via the use of patient data. Unfortunately, the use of such patient data may be complicated by various data privacy laws.

BRIEF DESCRIPTION OF THE DRAWINGS

Like reference symbols in the various drawings indicate like elements.

DETAILED DESCRIPTION OF THE PREFERRED EMBODIMENTS

As will be discussed in greater detail below, implementations of the present disclosure locally train a machine learning model at a plurality of different locations using locally-obtained deidentified data. This training data is then obtained from each of these plurality of locations so that the machine learning model can be centrally trained using the training data obtained from the plurality of locations.

This use of such a system enables the centralized training of a machine learning model using deidentified data from a plurality of locations, without the need to share such deidentified data with the centralized trainer.

The details of one or more implementations are set forth in the accompanying drawings and the description below. Other features and advantages will become apparent from the description, the drawings, and the claims.

Figure 1:
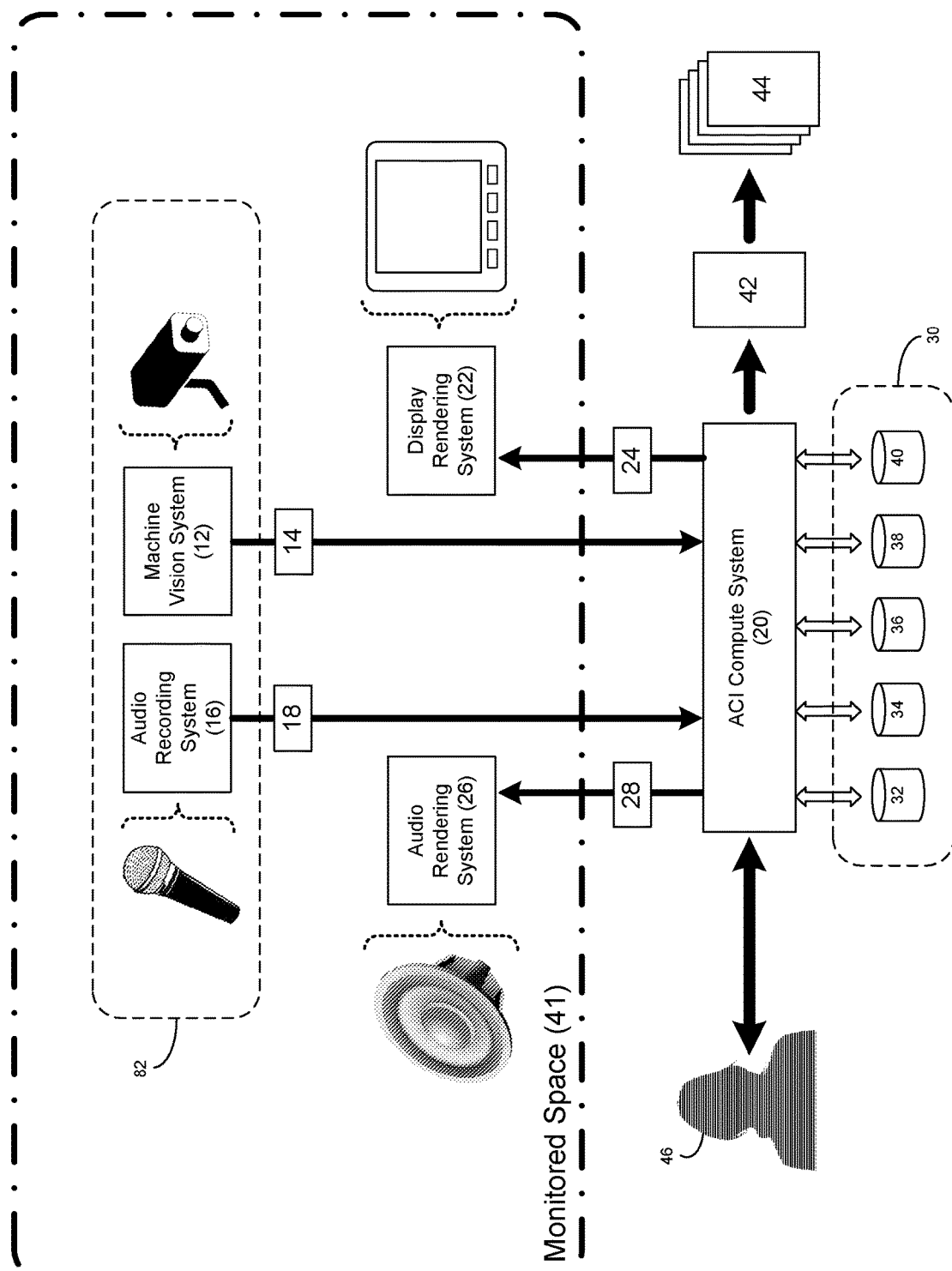
FIG. 1 is a diagrammatic view of an ambient cooperative intelligence (ACI) system.

Ambient Cooperative Intelligence System:

Referring to FIG. 1, while ambient cooperative intelligence (ACI) system 10 will be described below as being used to automate the collection and processing of clinical encounter information to generate/store/distribute medical records, this is for illustrative purposes only and is not intended to be a limitation of this disclosure, as other configurations are possible and are considered to be within the scope of this disclosure.

Examples of ACI system 10 include: machine vision system 12 to obtain machine vision encounter information 14 concerning a patient encounter; audio recording system 16 to obtain audio encounter information 18 concerning the patient encounter; and a compute system (e.g., ACI compute system 20) to receive machine vision encounter information 14 and audio encounter information 18 from machine vision system 12 and audio recording system 16 (respectively). In some implementations, ACI system 10 includes: display rendering system 22 to render visual information 24; and audio rendering system 26 to render audio information 28, wherein ACI compute system 20 provides visual information 24 and audio information 28 to display rendering system 22 and audio rendering system 26 (respectively).

In some implementations:
  machine vision system 12 includes: an RGB imaging system, an infrared imaging system, an ultraviolet imaging system, a laser imaging system, a SONAR imaging system, a RADAR imaging system, and/or a thermal imaging system.
  audio recording system 16 includes: a handheld microphone, a lapel microphone, an embedded microphone (e.g., embedded within eyeglasses, smart phones, tablet computers and/or watches), and/or an audio recording device.
  display rendering system 22 includes: a tablet computer, a computer monitor, and/or a smart television.
  audio rendering system 26 includes: a speaker system, a headphone system, and/or an earbud system.

In some implementations, ACI compute system 20 accesses one or more datasources 30 (e.g., plurality of individual datasources 32, 34, 36, 38, 40), examples of which include one or more of an electronic health record (EHR) datasource, a user profile datasource, a voice print datasource, a voice characteristics datasource, a face print datasource, a humanoid shape datasource, an utterance identifier datasource, a wearable token identifier datasource, an interaction identifier datasource, a medical conditions symptoms datasource, a prescriptions compatibility datasource, a medical insurance coverage datasource, a physical events datasource, and a home healthcare datasource.

ACI system 10 monitors a monitored space (e.g., monitored space 41) in a clinical environment, wherein examples of this clinical environment include: a doctor's office, a medical facility, a medical practice, a medical lab, an urgent care facility, a medical clinic, an emergency room, an operating room, a hospital, a long-term care facility, a rehabilitation facility, a nursing home, and a hospice facility. Accordingly, an example of the above-referenced patient encounter includes a patient visiting one or more of the above-described clinical environments (e.g., a doctor's office, a medical facility, a medical practice, a medical lab, an urgent care facility, a medical clinic, an emergency room, an operating room, a hospital, a long-term care facility, a rehabilitation facility, a nursing home, and a hospice facility).

In some implementations, machine vision system 12 includes a plurality of discrete machine vision systems when the above-described clinical environment is larger or a higher level of resolution is desired. As discussed above, examples of machine vision system 12 include: an RGB imaging system, an infrared imaging system, an ultraviolet imaging system, a laser imaging system, a SONAR imaging system, a RADAR imaging system, and a thermal imaging system. Accordingly and in some implementations, machine vision system 12 includes one or more of each of an RGB imaging system, an infrared imaging system, an ultraviolet imaging system, a laser imaging system, a SONAR imaging system, a RADAR imaging system, and a thermal imaging system.

In some implementations, audio recording system 16 includes a plurality of discrete audio recording systems when the above-described clinical environment is larger or a higher level of resolution is desired. As discussed above, examples of audio recording system 16 includes one or more of a handheld microphone, a lapel microphone, an embedded microphone (such as those embedded within eyeglasses, smart phones, tablet computers and/or watches) and an audio recording device. Accordingly and in some implementations, audio recording system 16 includes one or more of each of a handheld microphone, a lapel microphone, an embedded microphone (such as those embedded within eyeglasses, smart phones, tablet computers and/or watches) and an audio recording device.

In some implementations, display rendering system 22 includes a plurality of discrete display rendering systems when the above-described clinical environment is larger or a higher level of resolution is desired. As discussed above, examples of display rendering system 22 include: a tablet computer, a computer monitor, and a smart television. Accordingly and in some implementations, display rendering system 22 includes one or more of each of a tablet computer, a computer monitor, and a smart television.

In some implementations, audio rendering system 26 includes a plurality of discrete audio rendering systems when the above-described clinical environment is larger or a higher level of resolution is desired. As discussed above, examples of audio rendering system 26 include: a speaker system, a headphone system, or an earbud system. Accordingly and in some implementations, audio rendering system 26 includes one or more of each of a speaker system, a headphone system, or an earbud system.

In some implementations, ACI compute system 20 includes a plurality of discrete compute systems. As discussed above, examples of ACI compute system 20 includes various components, examples of which include: a personal computer, a server computer, a series of server computers, a mini computer, a mainframe computer, one or more Network Attached Storage (NAS) systems, one or more Storage Area Network (SAN) systems, one or more Platform as a Service (PaaS) systems, one or more Infrastructure as a Service (IaaS) systems, one or more Software as a Service (SaaS) systems, a cloud-based computational system, and a cloud-based storage platform. Accordingly and in some implementations, ACI compute system 20 includes one or more of each of a personal computer, a server computer, a series of server computers, a mini computer, a mainframe computer, one or more Network Attached Storage (NAS) systems, one or more Storage Area Network (SAN) systems, one or more Platform as a Service (PaaS) systems, one or more Infrastructure as a Service (IaaS) systems, one or more Software as a Service (SaaS) systems, a cloud-based computational system, and a cloud-based storage platform.

Figure 2:
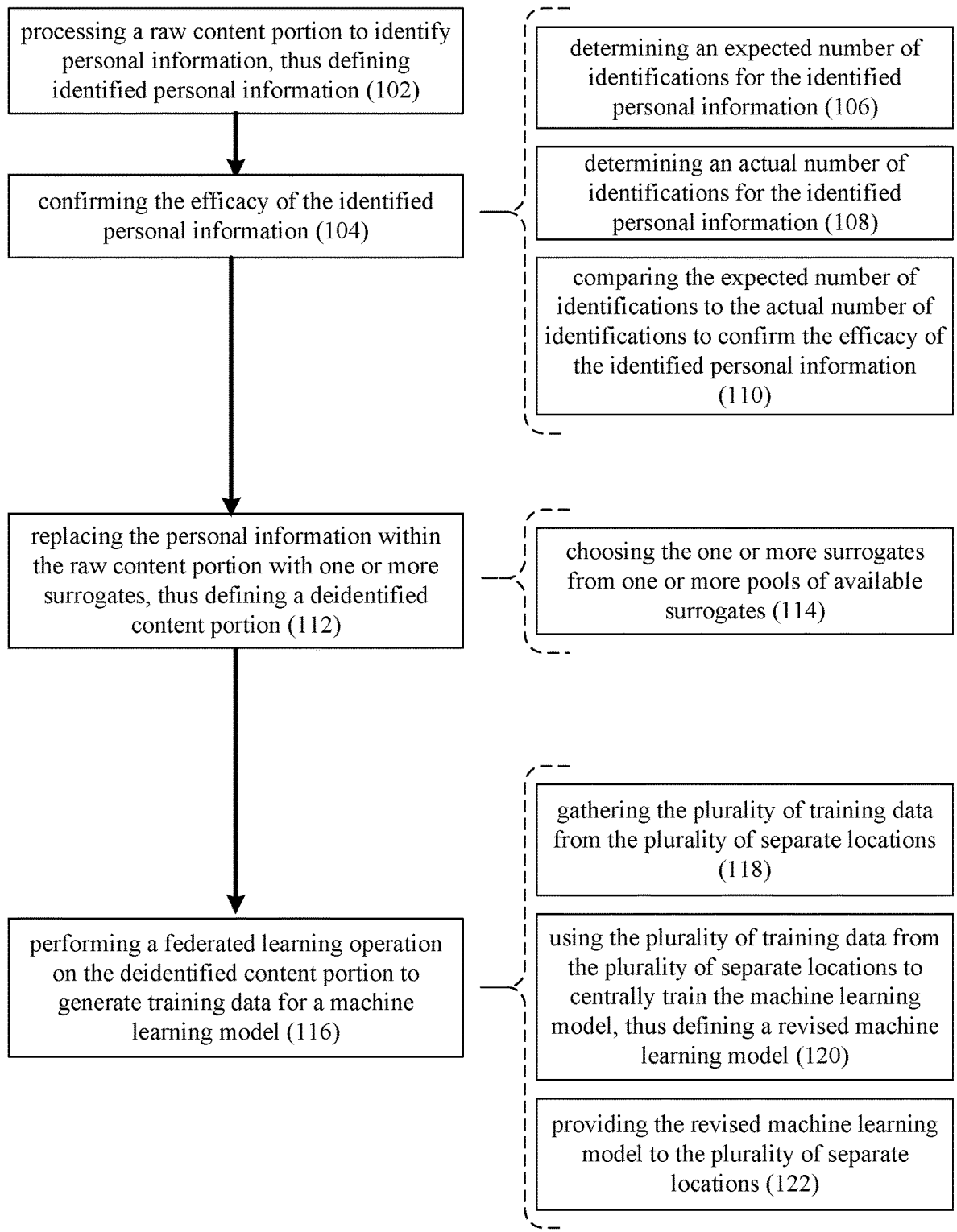
FIG. 2 is a flow chart of one implementation of a deidentification process.
Figure 3:
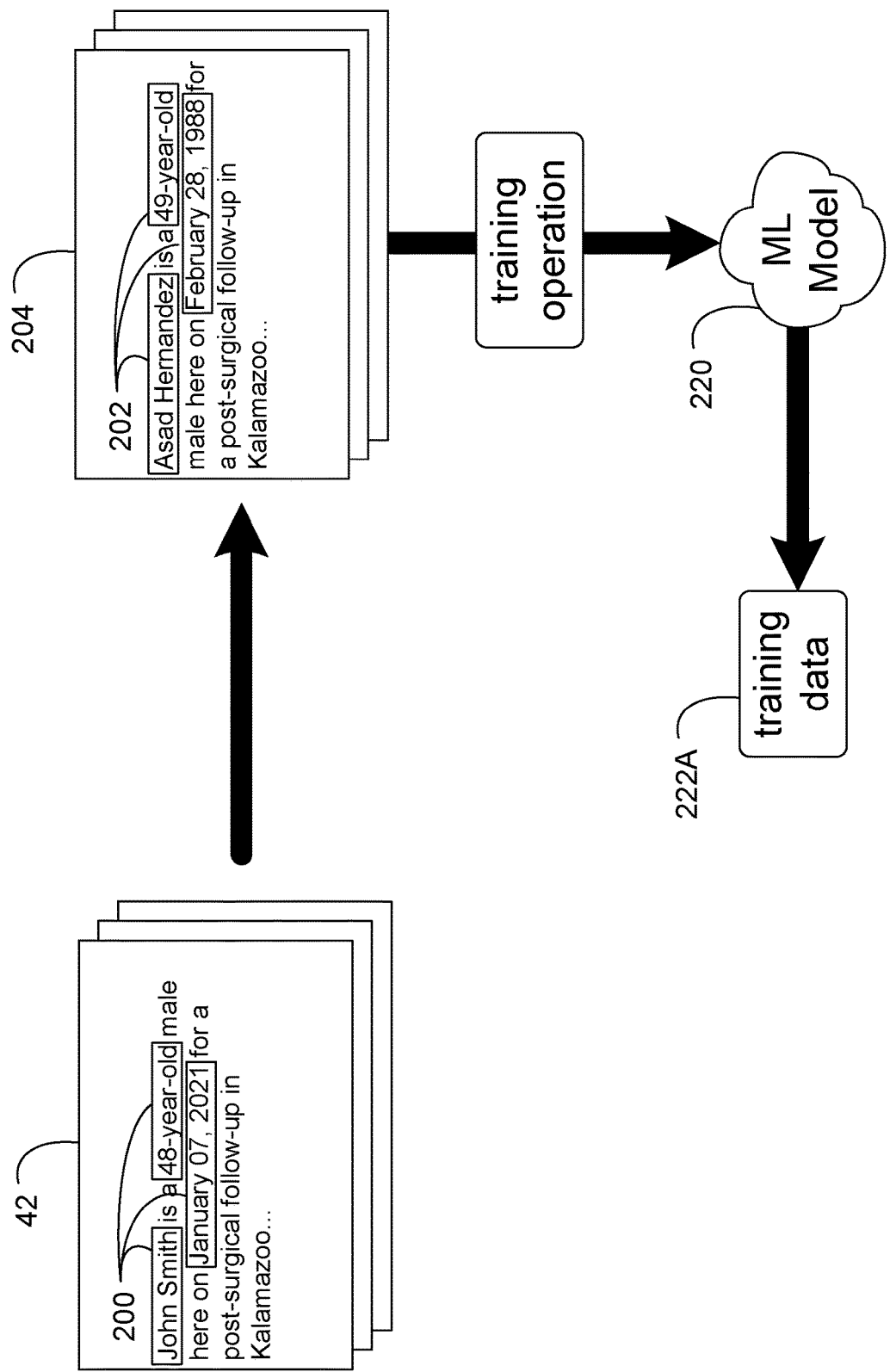
FIG. 3 is a diagrammatic view of mappings by the deidentification process of FIG. 1.

The Deidentification Process:

Referring also to FIGS. 2-3, ACI system 10 executes deidentification process 100. Deidentification process 100 processes 102 a raw content portion (e.g., encounter transcript 42) to identify personal information (e.g., identified personal information 200). While in this particular example, the raw content is described below as being an encounter transcript, this is for illustrative purposes only and is not intended to be a limitation of this disclosure, as other configurations are possible and are considered to be within the scope of this disclosure. Specifically, this raw content may be any raw content within which personal information (e.g., identified personal information 200) is included and, therefore, is not limited to an encounter transcript and/or medical content.

An example of the personal information (e.g., identified personal information 200) includes protected health information. Protected health information (PHI) under the U.S. law is any information about health status, provision of health care, or payment for health care that is created or collected by a Covered Entity (or a Business Associate of a Covered Entity), and can be linked to a specific individual. This is interpreted rather broadly and includes any part of a patient's medical record or payment history. Instead of being anonymized, PHI is often sought out in datasets for de-identification before researchers share the dataset publicly. Researchers remove individually identifiable PHI from a dataset to preserve privacy for research participants. There are many forms of PHI, with the most common being physical storage in the form of paper-based personal health records (PHR). Other types of PHI include electronic health records, wearable technology, and mobile applications. In recent years, there has been a growing number of concerns regarding the safety and privacy of PHI.

Continuing with the above-stated example, upon processing 102 encounter transcript 42 to identify the identified personal information 200 (e.g., identified personal information 200), deidentification process 100 confirms 104 the efficacy of the identified personal information (e.g., identified personal information 200).

The manner in which deidentification process 100 confirms 104 the efficacy of identified personal information 200 may vary depending upon personal preferences and design criteria. For example, deidentification process 100 may confirm 104 the efficacy of identified personal information 200 based upon statistical comparisons.

Accordingly and in such a configuration, when confirming 104 the efficacy of identified personal information 200, deidentification process 100:

determines 106 an expected number of identifications for the identified personal information (e.g., identified personal information 200). For this example, assume that there are (on average) three pieces of personal information on the average page of a transcript. If the raw content portion (e.g., encounter transcript 42) is ten pages long, thirty pieces of personal information are expected to be identified within the raw content portion (e.g., encounter transcript 42).

determines 108 an actual number of identifications for the identified personal information (e.g., identified personal information 200). Assume that there are only four pieces of personal information identified within the raw content portion (e.g., encounter transcript 42).

compares 110 the expected number of identifications to the actual number of identifications to confirm the efficacy of the identified personal information (e.g., identified personal information 200). Accordingly, when thirty (the expected number of identifications) is compared to four (the actual number of identifications), deidentification process 100 may deem the efficacy of this particular deidentification to be insufficient, as only 13.33% of the expected number of identifications was realized.

Once deidentification process 100 confirms 108 the efficacy of the identified personal information 200, deidentification process 100 replaces 112 the personal information (e.g., personal information 200) within the raw content portion (e.g., encounter transcript 42) with one or more surrogates (e.g., surrogates 202), thus defining a deidentified content portion (e.g., deidentified content portion 204). Generally speaking and as will be discussed below, the one or more surrogates (e.g., surrogates 202) may be discrete replacements for the individual pieces of personal information (e.g., personal information 200) include within (in this example) encounter transcript 42.

Figure 4:
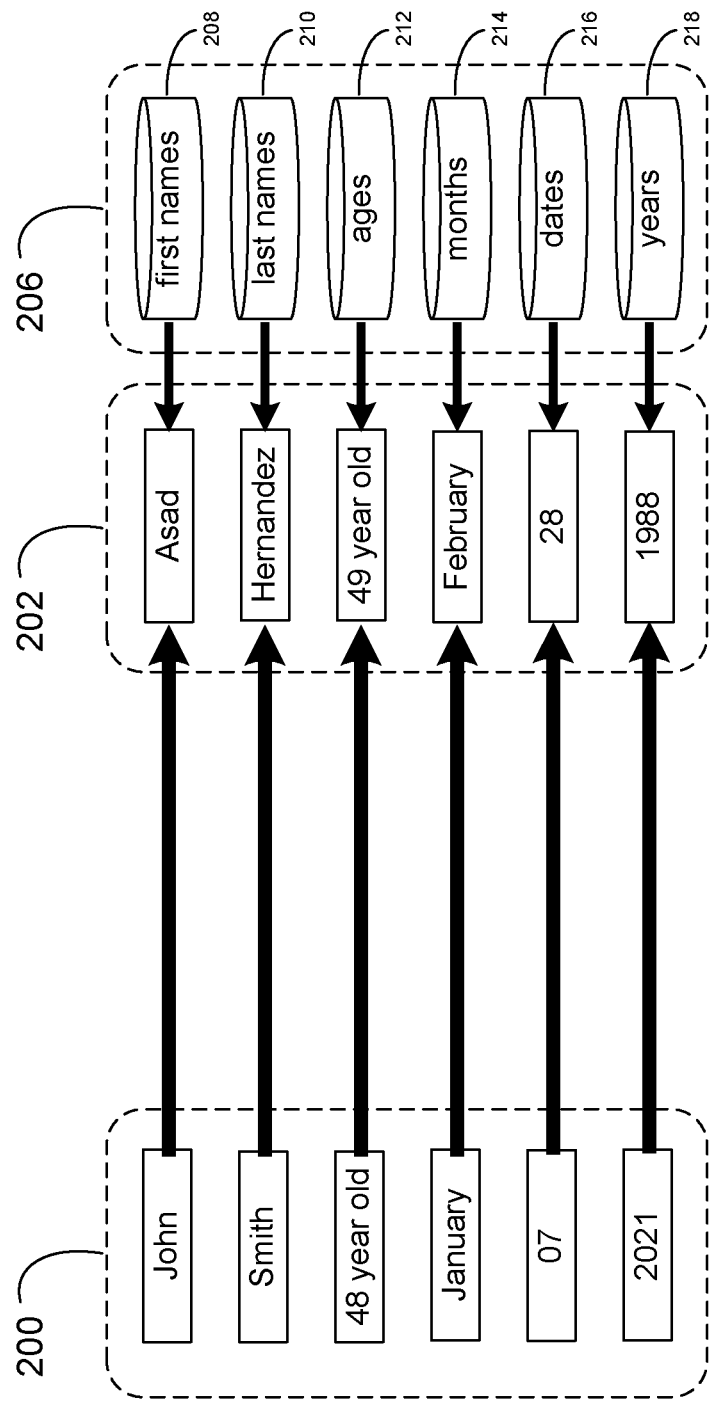
FIG. 4 is a diagrammatic view of mappings by the deidentification process of FIG. 1.

For example and referring also to FIG. 4, when replacing 112 the personal information (e.g., personal information 200) within the raw content portion (e.g., encounter transcript 42) with one or more surrogates (e.g., surrogates 202), deidentification process 100 chooses 114 one or more surrogates (e.g., surrogates 202) from one or more pools of available surrogates (e.g., available surrogate pool 206). For example, the one or more pools of available surrogates (e.g., available surrogate pool 206) may be compartmentalized into a plurality of discrete pools that are associated with the type of personal information (e.g., personal information 200) that is being replaced with the surrogates (e.g., surrogates 202).

In one implementation, the one or more pools of available surrogates (e.g., available surrogate pool 206) includes one or more of: a pool of names; a pool of locations; a pool of ailments; a pool of demographic identifiers; a pool of ages; a pool of genders; a pool of races; and a pool of ethnicities.

For example:
- Being "John" is a first name, when replacing 112 this personal information within encounter transcript 42, deidentification process 100 chooses 114 a surrogate from "first names" pool 208 within available surrogate pool 206. In this particular example, the surrogate chosen 114 is "Asad".
- Being "Smith" is a last name, when replacing 112 this personal information within encounter transcript 42, deidentification process 100 chooses 114 a surrogate from "last names" pool 210 within available surrogate pool 206. In this particular example, the surrogate chosen 114 is "Hernandez".
- Being "48-year-old" is an age, when replacing 112 this personal information within encounter transcript 42, deidentification process 100 chooses 114 a surrogate from "ages" pool 212 within available surrogate pool 206. In this particular example, the surrogate chosen 114 is "49-year-old".
- Being "January" is a month, when replacing 112 this personal information within encounter transcript 42, deidentification process 100 chooses 114 a surrogate from "Months" pool 214 within available surrogate pool 206. In this particular example, the surrogate chosen 114 is "February".
- Being "07" is a date, when replacing 112 this personal information within encounter transcript 42, deidentification process 100 chooses 114 a surrogate from "dates" pool 216 within available surrogate pool 206. In this particular example, the surrogate chosen 114 is "28".
- Being "2021" is a year, when replacing 112 this personal information within encounter transcript 42, deidentification process 100 chooses 114 a surrogate from "years" pool 218 within available surrogate pool 206. In this particular example, the surrogate chosen 114 is "1988".

Once deidentification process 100 replaces 112 the personal information (e.g., personal information 200) within the raw content portion (e.g., encounter transcript 42) with one or more surrogates (e.g., surrogates 202) to define deidentified content portion 204, deidentification process 100 may use deidentified content portion 204 for localized training of a machine learning model (e.g., ML model 220). An example of such a machine learning model (e.g., ML model 220) includes a predictive ML model that is used to predict that next word that will appear in (in this example) encounter transcript 42. A subject matter expert (SME) may be involved in this process, wherein a subject matter expert is an individual who is considered an expert on particular subjects (such as personal health information).

Machine learning (ML) is a field of inquiry devoted to understanding and building methods that 'learn', that is, methods that leverage data to improve performance on some set of tasks. It is seen as a part of artificial intelligence. Machine learning algorithms build a model based on sample data, known as training data, in order to make predictions or decisions without being explicitly programmed to do so. Machine learning algorithms are used in a wide variety of applications, such as in medicine, email filtering, speech recognition, and computer vision, where it is difficult or unfeasible to develop conventional algorithms to perform the needed tasks.

A subset of machine learning is closely related to computational statistics, which focuses on making predictions using computers, but not all machine learning is statistical learning. The study of mathematical optimization delivers methods, theory and application domains to the field of machine learning. Data mining is a related field of study, focusing on exploratory data analysis through unsupervised learning. Some implementations of machine learning use data and neural networks in a way that mimics the working of a biological brain. In its application across business problems, machine learning is also referred to as predictive analytics.

A machine learning system or model generally includes an algorithm or combination of algorithms that has been trained to recognize certain types of patterns. For example, machine learning approaches are generally divided into three categories, depending on the nature of the signal available: supervised learning, unsupervised learning, and reinforcement learning. Supervised learning includes presenting a computing device with example inputs and their desired outputs, given by a "teacher", where the goal is to learn a general rule that maps inputs to outputs. With unsupervised learning, no labels are given to the learning algorithm, leaving it on its own to find structure in its input. Unsupervised learning can be a goal in itself (discovering hidden patterns in data) or a means towards an end (feature learning). Reinforcement learning generally includes a computing device interacting in a dynamic environment in which it must perform a certain goal (such as driving a vehicle or playing a game against an opponent). As the machine learning system navigates its problem space, the machine learning system is provided feedback that's analogous to rewards, which it tries to maximize.

Continuing with the above-stated example, deidentification process 100 performs 116 a federated learning operation on the deidentified content portion (e.g., deidentified content portion 204) to generate training data (e.g., training data 222A) for the machine learning model (e.g., ML model 220). As will be discussed below in greater detail, such training data (e.g., training data 222A) includes any data that locally trains a local copy of ML model 220 and/or remotely-trains a remote copy of ML model 220.

Figure 5:
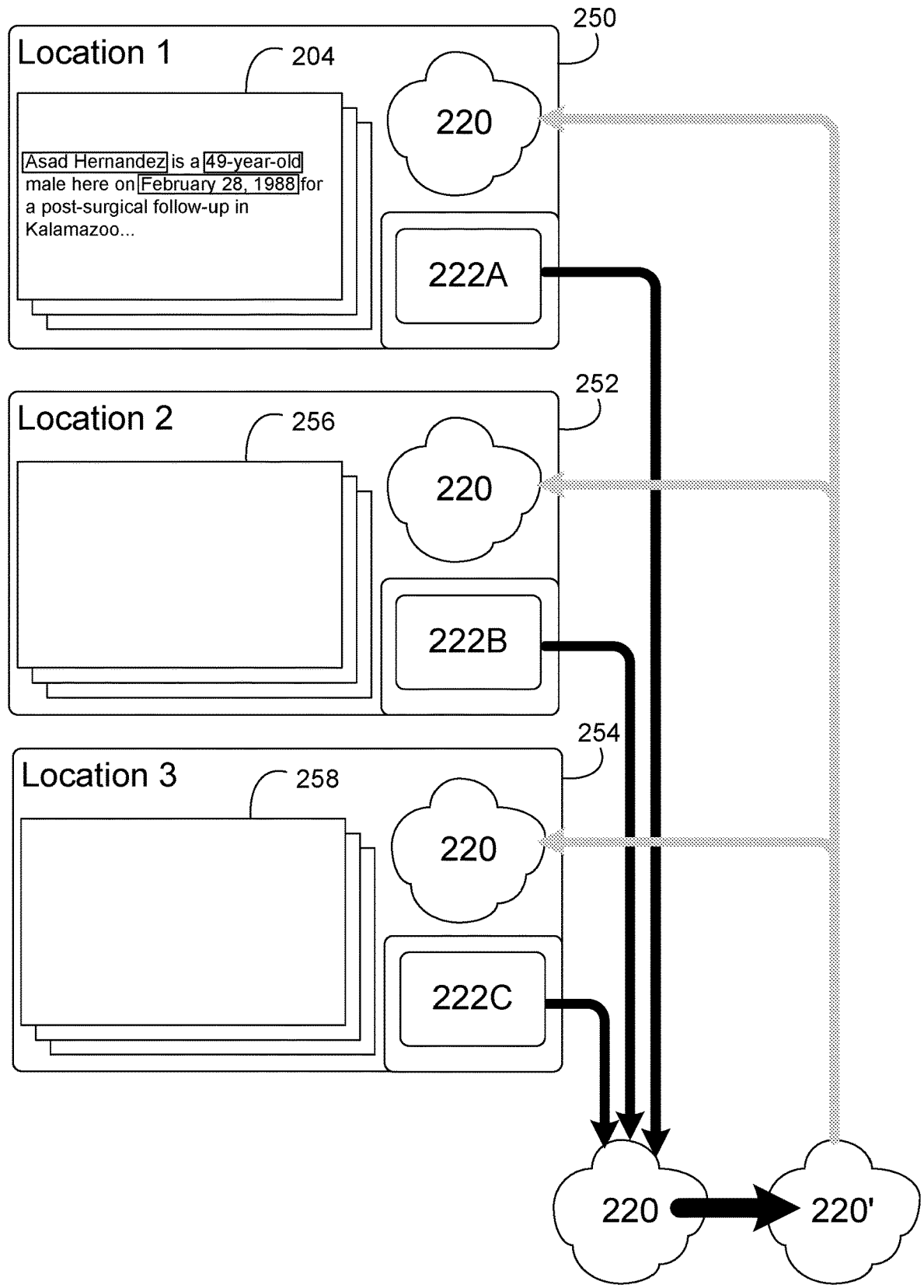
FIG. 5 is a diagrammatic view of multiple locations performing the deidentification process of FIG. 1.

Referring also to FIG. 5 and as will be discussed below, the machine learning model (e.g., ML model 220) is often trained at a plurality of separate locations (e.g., locations 250, 252, 254) using a plurality of deidentified content portions (e.g., deidentified content portions 204, 256, 258) generating a plurality of training data (e.g., training data 222A, 222B, 222C). Examples of these separate locations (e.g., locations 250, 252, 254) include separate businesses, separate medical institutions, separate organizations, etc. As discussed above, examples of such training data (e.g., training data 222A, 222B, 222C) includes any data that locally trains a local copy of ML model 220 and/or remotely-trains a remote copy of ML model 220. For example, this training data (e.g., training data 222A, 222B, 222C) may include a list of discrete changes made to the local copies of ML model 220 during the localized training of the same using the above-described local deidentified data. Additionally/alternatively, this training data (e.g., training data 222A, 222B, 222C) may include a copy of the locally-trained ML models (e.g., ML model 220) that were trained using the above-described local deidentified data.

Specifically, ML model 220 may be a local copy of a generally-used ML model. For example, assume that three separate locations (e.g., locations 250, 252, 254) are each training ML model 220 on their not-externally-available deidentified content portion (e.g., deidentified content portions 204, 256, 258) that was generated and maintained within their location (e.g., locations 250, 252, 254). Accordingly, location 250 generates their not-externally-available deidentified content portion (e.g., deidentified content portion 204) using their not-externally-available raw content; location 252 generates their not-externally-available deidentified content portion (e.g., deidentified content portion 256) using their not-externally-available raw content; and location 254 generates their not-externally-available deidentified content portion (e.g., deidentified content portion 258) using their not-externally-available raw content.

In some implementations, each of these separate locations (e.g., locations 250, 252, 254) use their not-externally-available deidentified content portion to train their local copy of ML model 220. Unfortunately, such a training methodology is often not ideal for various reason.

For example, as (in this example) three separate locations are each training their own copy of ML model 220, ML model 220 may be divergently trained, wherein the three separate copies of ML model 220 are each trained differently and evolve into three separate and distinct ML models. Additionally/alternatively, there may be a lack of diversity with respect to the training data at each of these three separate locations (e.g., locations 250, 252, 254). For example, if one of these locations is a hospital that specializes in women's medical issues, it is foreseeable that the training data will be overly weighted towards women. Further, if one of these locations is an inner-city hospital, it is foreseeable that the training data will be overly weighted towards minorities. Further still, if one of these locations is a rural hospital, it is foreseeable that the training data will be overly weighted toward Caucasians. Accordingly it is desirable to have an ML model (e.g., ML model 220) trained by a diverse group of locations dealing with a diverse group of people.

When performing 116 the above-described federated learning operation on the deidentified content portion (e.g., deidentified content portions 204, 256, 258) to generate training data (e.g., training data 222A, 222B, 222C) for a machine learning model (e.g., ML model 220), deidentification process 100 gathers 118 the plurality of training data (e.g., training data 222A, 222B, 222C) from the plurality of separate locations (e.g., locations 250, 252, 254). This training data (e.g., training data 222A, 222B, 222C) may be maintained in a manner that enables it to be available for retrieval from each of the locations (e.g., locations 250, 252, 254) while maintaining the security of deidentified content portions 204, 256, 258 and the related raw content. As discussed above, an example of this training data (e.g., training data 222A, 222B, 222C) may include a copy of the locally-trained ML models (e.g., ML model 220) that were trained using the above-described local deidentified data. So and in such a configuration, each of the separate locations (e.g., locations 250, 252, 254) receives a copy of ML model 220, wherein each of these separate locations (e.g., locations 250, 252, 254) locally-trains their copy of ML model 220, resulting in three differently-trained ML models (represented as training data 222A, 222B, 222C).

Additionally and when performing 116 the above-described federated learning operation on the deidentified content portion (e.g., deidentified content portions 204, 256, 258) to generate training data (e.g., training data 222A, 222B, 222C) for a machine learning model (e.g., ML model 220), deidentification process 100 uses 120 the plurality of training data (e.g., training data 222A, 222B, 222C) from the plurality of separate location (e.g., locations 250, 252, 254) to centrally train the machine learning model (e.g., ML model 220), thus defining a revised machine learning model (e.g., ML model 220').

Further and when performing 116 the above-described federated learning operation on the deidentified content portion (e.g., deidentified content portions 204, 256, 258) to generate training data (e.g., training data 222A, 222B, 222C) for a machine learning model (e.g., ML model 220), deidentification process 100 provides 122 the revised machine learning model (e.g., ML model 220') to the plurality of separate location (e.g., locations 250, 252, 254).

At this point in time, each of the locations (e.g., locations 250, 252, 254) can now use/train the revised machine learning model (e.g., ML model 220') until (at some point in the future) training data (e.g., training data 222A, 222B, 222C) is generated for the revised machine learning model (e.g., ML model 220') and the revised machine learning model (e.g., ML model 220') is itself revised.

Figure 6:
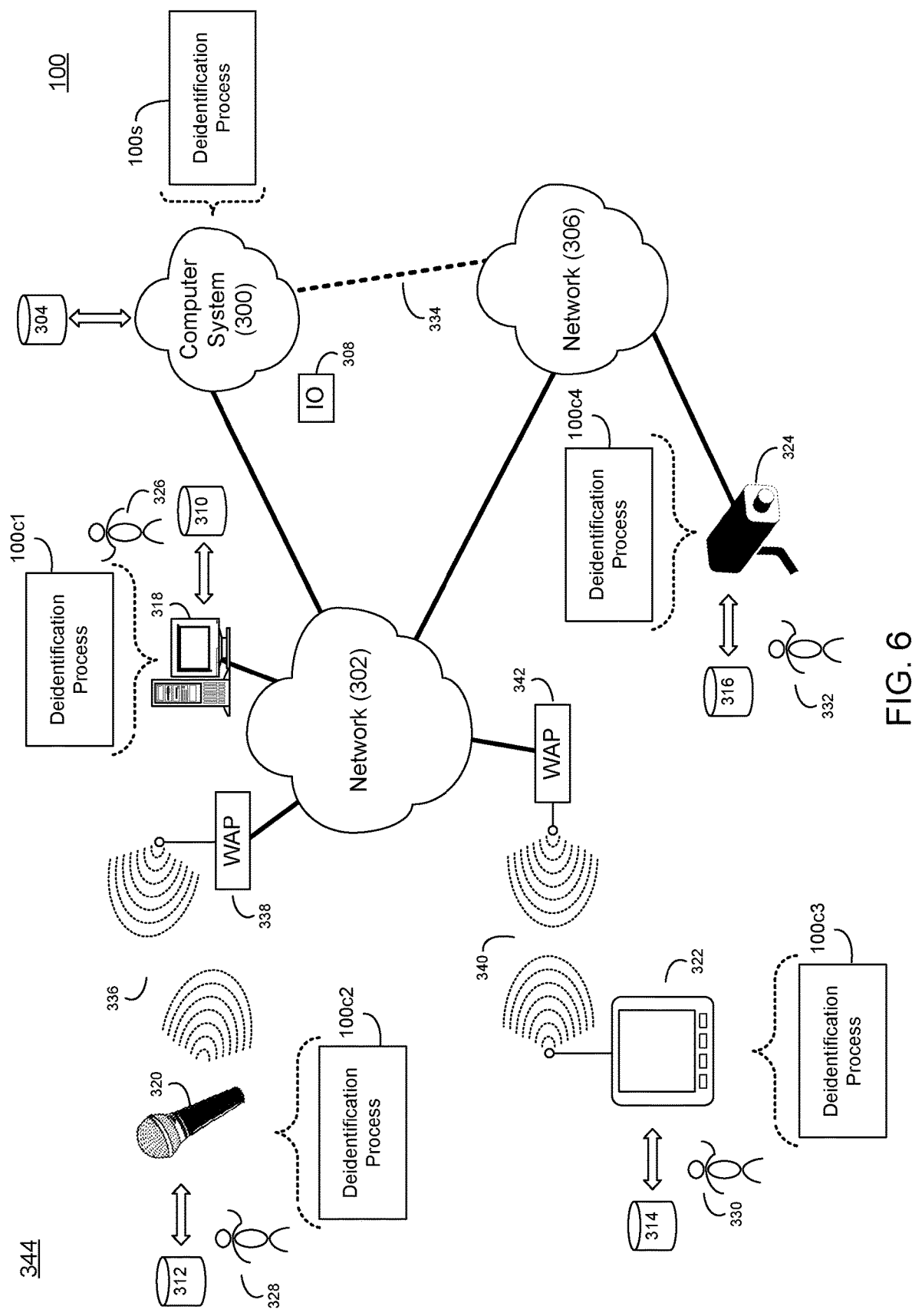
FIG. 6 is a diagrammatic view of a computer system and the deidentification process coupled to a distributed computing network.

System Overview:

Referring to FIG. 6, there is shown deidentification process 100. In some implementations, deidentification process 100 is implemented as a server-side process, a client-side process, or a hybrid server-side/client-side process. For example, deidentification process 100 may be implemented as a purely server-side process via deidentification process 100s. Alternatively, deidentification process 100 may be implemented as a purely client-side process via one or more of deidentification process 100c1, deidentification process 100c2, deidentification process 100c3, and deidentification process 100c4. Alternatively still, deidentification process 100 may be implemented as a hybrid server-side/client-side process via deidentification process 100s in combination with one or more of deidentification process 100c1, deidentification process 100c2, deidentification process 100c3, and deidentification process 100c4.

Accordingly, deidentification process 100 as used in this disclosure may include any combination of deidentification process 100s, deidentification process 100c1, deidentification process 100c2, deidentification process 100c3, and deidentification process 100c4.

In some implementations, deidentification process 100s is a server application and resides on and may be executed by a computer system 300, which may be connected to network 302 (e.g., the Internet or a local area network). Computer system 300 may include various components, examples of which include but are not limited to: a personal computer, a server computer, a series of server computers, a mini computer, a mainframe computer, one or more Network Attached Storage (NAS) systems, one or more Storage Area Network (SAN) systems, one or more Platform as a Service (PaaS) systems, one or more Infrastructure as a Service (IaaS) systems, one or more Software as a Service (SaaS) systems, a cloud-based computational system, and a cloud-based storage platform.

A SAN includes one or more of a personal computer, a server computer, a series of server computers, a mini computer, a mainframe computer, a RAID device and a NAS system. The various components of computer system 300 may execute one or more operating systems.

The instruction sets and subroutines of deidentification process 100s, which may be stored on storage device 304 coupled to computer system 300, may be executed by one or more processors (not shown) and one or more memory architectures (not shown) included within computer system 300. Examples of storage device 304 may include but are not limited to: a hard disk drive; a RAID device; a random access memory (RAM); a read-only memory (ROM); and all forms of flash memory storage devices.

Network 302 may be connected to one or more secondary networks (e.g., network 304), examples of which may include but are not limited to: a local area network; a wide area network; or an intranet, for example.

Various IO requests (e.g., IO request 308) may be sent from deidentification process 100s, deidentification process 100c1, deidentification process 100c2, deidentification process 100c3 and/or deidentification process 100c4 to computer system 300. Examples of IO request 308 may include but are not limited to data write requests (i.e., a request that content be written to computer system 300) and data read requests (i.e., a request that content be read from computer system 300).

The instruction sets and subroutines of deidentification process 100c1, deidentification process 100c2, deidentification process 100c3 and/or deidentification process 100c4, which may be stored on storage devices 310, 312, 314, 316 (respectively) coupled to client electronic devices 318, 320, 322, 324 (respectively), may be executed by one or more processors (not shown) and one or more memory architectures (not shown) incorporated into client electronic devices 318, 320, 322, 324 (respectively). Storage devices 310, 312, 314, 316 may include but are not limited to: hard disk drives; optical drives; RAID devices; random access memories (RAM); read-only memories (ROM), and all forms of flash memory storage devices. Examples of client electronic devices 318, 320, 322, 324 may include, but are not limited to, personal computing device 318 (e.g., a smart phone, a personal digital assistant, a laptop computer, a notebook computer, and a desktop computer), audio input device 320 (e.g., a handheld microphone, a lapel microphone, an embedded microphone (such as those embedded within eyeglasses, smart phones, tablet computers and/or watches) and an audio recording device), display device 322 (e.g., a tablet computer, a computer monitor, and a smart television), machine vision input device 324 (e.g., an RGB imaging system, an infrared imaging system, an ultraviolet imaging system, a laser imaging system, a SONAR imaging system, a RADAR imaging system, and a thermal imaging system), a hybrid device (e.g., a single device that includes the functionality of one or more of the above-references devices; not shown), an audio rendering device (e.g., a speaker system, a headphone system, or an earbud system; not shown), various medical devices (e.g., medical imaging equipment, heart monitoring machines, body weight scales, body temperature thermometers, and blood pressure machines; not shown), and a dedicated network device (not shown).

Users 326, 328, 330, 332 may access computer system 300 directly through network 302 or through secondary network 306. Further, computer system 300 may be connected to network 302 through secondary network 306, as illustrated with link line 334.

The various client electronic devices (e.g., client electronic devices 318, 320, 322, 324) may be directly or indirectly coupled to network 302 (or network 306). For example, personal computing device 318 is shown directly coupled to network 302 via a hardwired network connection. Further, machine vision input device 324 is shown directly coupled to network 306 via a hardwired network connection. Audio input device 322 is shown wirelessly coupled to network 302 via wireless communication channel 336 established between audio input device 320 and wireless access point (i.e., WAP) 338, which is shown directly coupled to network 302. WAP 338 may be, for example, an IEEE 802.11a, 802.11b, 802.11g, 802.11n, Wi-Fi™, and/or Bluetooth™ device that is capable of establishing wireless communication channel 336 between audio input device 320 and WAP 338. Display device 322 is shown wirelessly coupled to network 302 via wireless communication channel 340 established between display device 322 and WAP 342, which is shown directly coupled to network 302.

The various client electronic devices (e.g., client electronic devices 318, 320, 322, 324) may each execute an operating system, wherein the combination of the various client electronic devices (e.g., client electronic devices 318, 320, 322, 324) and computer system 300 may form modular system 344.

General

The present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be used. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object-oriented programming language. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet.

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general-purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, not at all, or in any combination with any other flowcharts depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:
   identifying instances of personal information within raw content;
   confirming the efficacy of the identification of personal information within the raw content by determining that a number of the instances of personal information within the raw content meets or exceeds an expected number of instances of personal information within the raw content, wherein the expected number of instances of personal information within the raw content is determined based on a type and a length of the raw content;
   in response to confirming the efficacy of the identification of personal information within the raw content, replacing the instances of personal information within the raw content with one or more surrogates to obtain deidentified content; and
   performing a federated learning operation on the deidentified content to generate training data for a machine learning model, wherein local copies of the machine learning model are trained at separate locations using the training data generated from the deidentified content.

2. The computer-implemented method of claim 1, wherein performing the federated learning operation on the deidentified content to generate the training data for the machine learning model further includes:
gathering the training data from the separate locations.

3. The computer-implemented method of claim 2, wherein performing the federated learning operation on the deidentified content to generate the training data for the machine learning model further includes:
using the training data gathered from the separate locations to centrally train the machine learning model to obtain a revised machine learning model.

4. The computer-implemented method of claim 3, wherein performing the federated learning operation on the deidentified content to generate the training data for the machine learning model further includes:
providing the revised machine learning model to the separate locations.

5. The computer-implemented method of claim 1, wherein the personal information includes protected health information.

6. The computer-implemented method of claim 1, wherein replacing the instances of personal information within the raw content with the one or more surrogates includes:
choosing the one or more surrogates from one or more pools of available surrogates.

7. The computer-implemented method of claim 6, wherein the one or more pools of available surrogates includes one or more of:
a pool of names;
a pool of locations;
a pool of ailments;
a pool of demographic identifiers;
a pool of ages;
a pool of genders;
a pool of races; and
a pool of ethnicities.

8. A computer program product comprising a non-transitory computer readable medium having programming instructions stored thereon which, when executed by a processor, cause the processor to perform operations comprising:
identifying instances of personal information within raw content;
confirming the efficacy of the identification of personal information within the raw content by determining that a number of the instances of personal information within the raw content meets or exceeds an expected number of instances of personal information within the raw content, wherein the expected number of instances of personal information within the raw content is determined based on a type and a length of the raw content;
in response to confirming the efficacy of the identification of personal information within the raw content, replacing the instances of personal information within the raw content with one or more surrogates to obtain deidentified content; and
performing a federated learning operation on the deidentified content to generate training data for a machine learning model, wherein local copies of the machine learning model are trained at separate locations using the training data generated from the deidentified content.

9. The computer program product of claim 8, wherein performing the federated learning operation on the deidentified content to generate the training data for the machine learning model further includes:
gathering the training data from the separate locations.

10. The computer program product of claim 9, wherein performing the federated learning operation on the deidentified content to generate the training data for the machine learning model further includes:
using the training data gathered from the separate locations to centrally train the machine learning model to obtain a revised machine learning model.

11. The computer program product of claim 10, wherein performing the federated learning operation on the deidentified content to generate the training data for the machine learning model further includes:
providing the revised machine learning model to the separate locations.

12. The computer program product of claim 8, wherein replacing the instances of personal information within the raw content with the one or more surrogates includes:
choosing the one or more surrogates from one or more pools of available surrogates.

13. The computer program product of claim 12, wherein the one or more pools of available surrogates includes one or more of:
a pool of names;
a pool of locations;
a pool of ailments;
a pool of demographic identifiers;
a pool of ages;
a pool of genders;
a pool of races; and
a pool of ethnicities.

14. A computing system comprising:
a processor; and
a memory storing programming instructions for execution by the processor, wherein the programming instructions, upon execution by the processor, cause the computing system to perform the following operations:
identifying instances of personal information within raw content;
confirming the efficacy of the identification of personal information within the raw content by determining that a number of the instances of personal information within the raw content meets or exceeds an expected number of instances of personal information within the raw content, wherein the expected number of instances of personal information within the raw content is determined based on a type and a length of the raw content;
in response to confirming the efficacy of the identification of personal information within the raw content, replacing the instances of personal information within the raw content with one or more surrogates to obtain deidentified content; and
performing a federated learning operation on the deidentified content to generate training data for a machine learning model, wherein local copies of the machine learning model are trained at separate locations using the training data generated from the deidentified content.

15. The computing system of claim 14, wherein performing the federated learning operation on the deidentified content to generate the training data for the machine learning model further includes:
  gathering the training data from the separate locations;
  using the training data gathered from the separate locations to centrally train the machine learning model to obtain a revised machine learning model.

16. The computing system of claim 15, wherein performing the federated learning operation on the deidentified content to generate the training data for the machine learning model further includes:
  providing the revised machine learning model to the separate locations.

17. The computing system of claim 15, wherein the personal information includes protected health information.

18. The computer program product of claim 8, wherein the personal information includes protected health information.

\* \* \* \* \*